United States Patent Office 3,265,397
Patented August 9, 1966

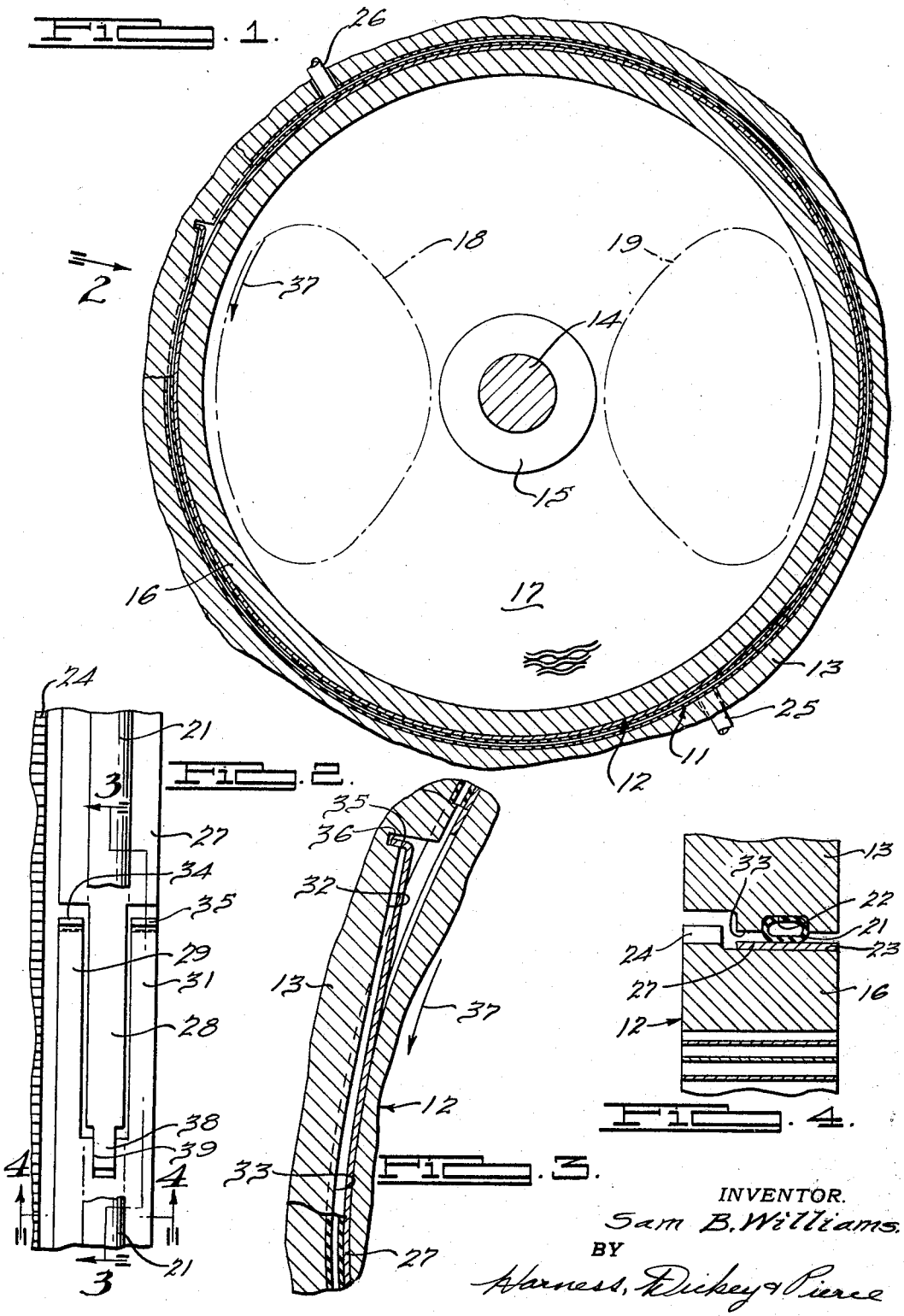

3,265,397
SEAL USED IN CONJUNCTION WITH REGENERATOR
Sam B. Williams, Walled Lake, Mich., assignor to Williams Research Corporation, Walled Lake, Mich., a corporation of Michigan
Filed Apr. 26, 1963, Ser. No. 275,924
1 Claim. (Cl. 277—34.3)

This invention relates to seals, and more particularly to devices for preventing the flow of gases in a gas turbine adjacent a rotary matrix heat exchanger or regenerator.

It is an object of the invention to provide a novel and improved gas seal for gas turbine regenerator matrices which has a relatively high degree of flexibility to compensate for the spatial changes which occur due to temperature variations within the gas turbine during operation.

It is a further object to provide an improved seal of this type which is inexpensive to construct, is reliable in use and requires little maintenance.

Other objects, features, and advantages of the present invention will become apparent from the subsequent description, taken in conjunction with the accompanying drawings.

In the drawings:

FIGURE 1 is an end elevational view, partly sectioned, of a gas turbine regenerator matrix and a portion of the adjacent gas turbine housing, showing a seal between the regenerator and housing which incorporates the principles of the invention;

FIGURE 2 is a side view of a portion of the seal and shoe looking in the direction of the arrow 2 in FIGURE 1, the housing being removed;

FIGURE 3 is a cross-sectional view taken along the line 3—3 of FIGURE 2 and showing the manner of engagement of the shoe with the housing, and FIGURE 4 is a cross-sectional view taken along the line 4—4 of FIGURE 2 and showing the cross-sectional configuration of the seal tube and shoe.

In general terms, the illustrated embodiment of the invention comprises a tube fabricated of a rubberlike material, the tube being closed upon itself and being disposed within an annular recess in a gas turbine housing which faces the rim of a regenerator matrix of the rotatable type. An annular metal shoe having a smooth surface engageable with the matrix rim is disposed between this rim and the rubberlike tube. The shoe is separated at one point in its circumference, having male and female portions in guiding relationship to allow for expansion and contraction. A pair of hooks are bent out from the shoe at the separated portion thereof, these hooks being engageable in a slot formed in the housing to hold the shoe stationary as it frictionally engages the rotating matrix.

Referring more particularly to the drawings, the seal is generally indicated at 11 and is disposed between a cylindrical or disk-like rotary gas turbine regenerator matrix, generally indicated at 12, and the surrounding portion 13 of the gas turbine housing. In accordance with conventional practice, matrix 12 has a supporting shaft 14, an inner hub 15, an outer rim 16, and a core 17 having a multiplicity of small passages through which gases may pass between the flat matrix ends. A plurality of circumferentially spaced areas on core 17, indicated in dot-dash lines at 18 and 19 in FIGURE 1, receive air from the compressor, while the remaining areas of the core receive hot gases from the turbine. The rotating matrix will thus be alternately heated by the hot gases and cooled by the compressor air, thus serving to heat the latter before it arrives at the combustion chamber.

Seal 11 is especially adapted for exposure on one side to the hot gases of relatively low pressure delivered to the matrix, and on the other side to atmospheric pressure. The seal comprises a tube 21 which is fabricated of a rubberlike material with heat-resistant qualities such as silicone rubber. This tube is closed upon itself, forming a continuous loop. If desired, tube 21 may be reinforced by means such as a heat-resistant fabric strip (not shown) embedded therein.

An annular recess or groove 22 is formed in housing 13 facing the outer surface 23 of regenerator rim 16, a gear 24 being formed on rim 16 adjacent surface 23, as seen in FIGURE 4, for rotatably driving matrix 12. Tube 21 is disposed within groove 22, the depth of the groove being preferably such that tube 21 will partially protrude therefrom.

A pair of pressurized coolant connections 25 and 26 are carried by tube 21, these connections being circumferentially spaced as seen in FIGURE 1 and passing through the adjacent portions of housing 13. Connections 25 and 26 are adapted to conduct water or other pressurized coolant through tube 21, thus serving both to cool the rubberlike material of the tube and to create outward pressure within the tube, forcing the free portion of the tube wall toward the surface 23 of regenerator rim 16.

A shoe 27 is provided between tube 21 and surface 23 of the regenerator rim. Shoe 27 is preferably fabricated of a heat-resistant metal, and is of curved shape to correspond with surface 23. The inner surface of shoe 27 engages surface 23 and is smoothly finished. Shoe 27 is somewhat wider than tube 21 and is engageable thereby to force shoe 27 against rim surface 23, the shoe being spaced from the adjacent surface of housing 13. Shoe 27 is not continuous but has one end 28 which is narrower than the main portion of the shoe and is disposed between a pair of extensions 29 and 31 at the other end of the shoe, extensions 29 and 31 forming a forked shoe end. Tube 21 is disposed between extensions 29 and 31, and overlaps extension 28, as seen in FIGURE 2.

A relieved portion 32 is formed in housing 13 adjacent ends 29 and 31, this portion being tangent to the main surface 33 of housing 13 which faces regenerator 12. A pair of hooked ends 34 and 35 are formed on extensions 29 and 31, respectively, and these ends are received by a recess 36 at the outer end of relieved portion 32, recess 36 extending at substantially right angles to the main surface of portion 32, as seen in FIGURE 3.

The disposition of the parts is such that when matrix 12 rotates in the direction of the arrow marked 37 in FIGURES 1 and 3, shoe 27 will be prevented from rotating along with the regenerator. The outer end of extension 28 has a narrower extension 38 which is slidably disposed within an open-ended slot 39 between the inner ends of extensions 29 and 31, as seen in FIGURE 2. Shoe 27 will thus be maintained in proper circumferential alignment and the interfitting parts will form a seal which is continuously engageable with regenerator rim surface 23, since the inner ends of extensions 29 and 31 are themselves in frictional engagement with surface 23.

In operation, pressurized coolant will be supplied to the interior of tube 21 through connections 25 and 26, thus forcing shoe 27 against surface 23. As matrix 12 rotates in the direction of arrow 37, the hot gases on one side of seal 11 will be contained by the seal. Since the average temperature of the substantial mass which comprises rim 16 will be somewhere between the temperatures of the relatively cool air passing through areas 18 and 19 and the hot gases passing through the matrix between these areas, the coolant passing through tube 21 will be capable of maintaining the rubberlike material at sufficiently low temperatures to prevent damage to or deterioration of the seal. The engagement of hooked portions 34 and 35 of shoe 27 with housing 13 will prevent unwanted rotational movement of the shoe.

While it will be apparent that the preferred embodiment of the invention disclosed is well calculated to fulfill the objects above stated, it will be appreciated that the invention is susceptible to modification, variation and change without departing from the proper scope or fair meaning of the sub-joined claim.

What is claimed is:

In a seal for use in conjunction with the outer cylindrical surface of a rotary regenerator matrix in a gas turbine, a closed loop formed of a rubber-like tube having heat-resistant properties, pressurized coolant connections for said tube, a housing portion surrounding said matrix and having an annular inwardly facing main surface and an annular groove in said main surface, said tube being disposed within said groove, a shoe comprising a circular strip disposed between said tube and matrix surface and having a smooth inner surface engaging said matrix surface, said strip being wider than said tube, a central extension on one end of said strip, a pair of extensions on the other end of said strip forming a recess therebetween, said first-mentioned extension and said tube being disposed within said recess and overlapping said other end between said extensions for providing a continuous surface in contact with said matrix surface, hooked ends on said spaced extensions, and a relieved portion in said housing portion extending tangentially to said main surface and within the lateral confines of said strip, said relieved portion having a notch formed at the outer end thereof receiving said hooked ends, whereby rotational movement of said shoe will be prevented when said matrix rotates.

References Cited by the Examiner

UNITED STATES PATENTS

| | | | |
|---|---|---|---|
| 2,481,553 | 9/1949 | Williams | 277—136 |
| 2,832,618 | 4/1958 | Knoll et al. | 277—34 |
| 2,969,644 | 1/1961 | Williams et al. | 60—39.51 X |

FOREIGN PATENTS

| | | |
|---|---|---|
| 440,974 | 5/1912 | France. |
| 647,650 | 12/1950 | Great Britain. |

SAMUEL ROTHBERG, *Primary Examiner.*

LAVERNE D. GEIGER, *Examiner.*